(12) United States Patent
Liang et al.

(10) Patent No.: US 8,595,485 B2
(45) Date of Patent: Nov. 26, 2013

(54) SECURITY MANAGEMENT METHOD AND SYSTEM FOR WAPI TERMINAL ACCESSING IMS NETWORK

(75) Inventors: Jiehui Liang, Shenzhen (CN); Yuanqing Shi, Shenzhen (CN); Jiabing Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 158 days.

(21) Appl. No.: 13/143,485

(22) PCT Filed: Jul. 16, 2009

(86) PCT No.: PCT/CN2009/072794
§ 371 (c)(1),
(2), (4) Date: Jul. 6, 2011

(87) PCT Pub. No.: WO2010/081313
PCT Pub. Date: Jul. 22, 2010

(65) Prior Publication Data
US 2011/0276798 A1 Nov. 10, 2011

(30) Foreign Application Priority Data
Jan. 16, 2009 (CN) .......................... 2009 1 0000198

(51) Int. Cl.
*H04L 9/00* (2006.01)
*H04L 29/06* (2006.01)
*H04L 9/08* (2006.01)
*G06F 21/00* (2013.01)

(52) U.S. Cl.
USPC ............... 713/156; 713/172; 726/3; 380/247; 380/249; 455/406; 455/411

(58) Field of Classification Search
USPC .......................................................... 713/156
See application file for complete search history.

(56) References Cited

U.S. PATENT DOCUMENTS 7,149,522 B2 * 12/2006 Koskelainen ............... 455/435.1
7,509,124 B2 * 3/2009 O'Neil ........................ 455/432.2
(Continued)

FOREIGN PATENT DOCUMENTS

CN 1708018 A 12/2005
CN 1968495 A 5/2007
(Continued)

OTHER PUBLICATIONS

Abid, M., et al, 'Integrating Identity-Based Cryptography in IMS Service Authentication', International Journal of Network Security & Its Applications (IJNSA), vol. 1, No. 3, Oct. 2009, entire document, http://airccse.org/journal/nsa/1009s1.pdf.*

(Continued)

*Primary Examiner* — Edan Orgad
*Assistant Examiner* — Ronald Baum
(74) *Attorney, Agent, or Firm* — Brian J. Colandreo; Michael T. Abramson; Holland & Knight LLP

(57) ABSTRACT

The present invention discloses a security management method and a security management system for a WAPI terminal accessing an IMS network. The method comprises: an authentication service unit (ASU) sending, under the circumstance that an access point and the WAPI terminal pass the verification of the ASU, a security information request message to a home subscriber server (HSS) (S302); the HSS setting security information corresponding to the IMS account information of the WAPI terminal as access layer security after receiving the security information request message from the ASU (S304); a proxy-call session control function (P-CSCF) receiving an IMS login request message from the WAPI terminal, inquiring about the security information of the WAPI terminal through the HSS, and allowing the WAPI terminal to execute an IMS service flow under the circumstance that the security information of the WAPI terminal is the access layer security (S306).

14 Claims, 5 Drawing Sheets

(56) References Cited

U.S. PATENT DOCUMENTS

| | | | |
|---|---|---|---|
| 8,054,780 B1* | 11/2011 | Manroa et al. | 370/328 |
| 8,068,469 B2* | 11/2011 | Chiu et al. | 370/338 |
| 8,144,591 B2* | 3/2012 | Ghai et al. | 370/235 |
| 8,181,030 B2* | 5/2012 | Lee et al. | 713/185 |
| 8,213,901 B2* | 7/2012 | Hartikainen et al. | 455/411 |
| 8,233,401 B2* | 7/2012 | Rosenberg et al. | 370/252 |
| 2004/0225878 A1* | 11/2004 | Costa-Requena et al. | 713/150 |
| 2006/0002308 A1* | 1/2006 | Na et al. | 370/252 |
| 2006/0195565 A1* | 8/2006 | De-Poorter | 709/224 |
| 2006/0271693 A1* | 11/2006 | Thiebaut et al. | 709/229 |
| 2007/0174443 A1* | 7/2007 | Shaheen et al. | 709/223 |
| 2008/0095070 A1 | 4/2008 | Chan et al. | |
| 2008/0120700 A1* | 5/2008 | Pandey et al. | 726/4 |
| 2008/0144637 A1* | 6/2008 | Sylvain et al. | 370/401 |
| 2008/0254833 A1* | 10/2008 | Keevill et al. | 455/558 |
| 2009/0016334 A1* | 1/2009 | Forsberg et al. | 370/389 |
| 2009/0220091 A1* | 9/2009 | Howard | 380/277 |
| 2010/0154029 A1* | 6/2010 | Fernandez Alonso et al. | 726/1 |
| 2010/0246444 A1* | 9/2010 | Witzel et al. | 370/255 |
| 2010/0333173 A1* | 12/2010 | Barriga et al. | 726/2 |

FOREIGN PATENT DOCUMENTS

| | | |
|---|---|---|
| CN | 101083838 A | 12/2007 |
| CN | 101478753 A | 7/2009 |
| EP | 1 633 108 A1 | 3/2006 |
| WO | 2007052894 A1 | 5/2007 |

OTHER PUBLICATIONS

International Search Report, mailed Oct. 29, 2009, in counterpart International Patent Application No. PCT/CN2009/072794, 4 pages.

Extended European Search Report, mailed Jun. 5, 2013, in counterpart European Patent Application No. 09838100.7, 8 pages.

Celetano, D, et al., "Improved Authentication for IMS Registration in 3G/WLAN Interworking", IEEE International Symposium on Personal, Indoor and Mobile Radio Communications, 2007, pp. 1-5.

Ntantogian, C, et al., "Reducing the User Authentication Costs in Next Generation Networks", Wireless On Demand Network Systems and Services, Fifth Annual Conference, IEEE, Jan. 23, 2008, pp. 65-72.

Chang, M-F, et al., "One-Pass GPRS and IMS Authentication Procedure for UMTS", IEEE Journal on Selected Areas in Communications, vol. 23(6), 2005, pp. 1233-1239.

* cited by examiner

SECURITY MANAGEMENT METHOD AND SYSTEM FOR WAPI TERMINAL ACCESSING IMS NETWORK

RELATED APPLICATIONS

The subject application is a U.S. National Stage application of International Application No. PCT/CN2009/072794, filed on 16 Jul. 2009, which claims the priority of Chinese Patent Application No.: 200910000198.2, filed on 16 Jan. 2009, the contents of which are herein incorporated by reference in its entirety.

FIELD OF THE INVENTION

The present invention relates to the communication field, in particular to a security management method and a security management system for a WLAN authentication privacy infrastructure (WAPI) terminal accessing an IP multimedia subsystem (IMS) network.

BACKGROUND OF THE INVENTION

The IP multimedia subsystem (IMS) is a network functional architecture for helping with the establishment and deployment of multimedia services. The IMS supports interoperability and network convergence, allows network operators to play a key role in flow distribution, and is therefore like a data pipeline.

The IMS is drafted and designed by the 3rd generation partnership project (3GPP) of the wireless standard working group at the very beginning as a part of the network evolution of the global system for mobile communications (GSM). The initial standard (3GPP R5) is used for providing interne multimedia services on the general packet radio service (GPRS). Through constant updating and revision thereafter, the standard is applicable to the networks such as GPRS, wireless LAN (WLAN), TD network, wideband code division multiple access (WCDMA) network, CDMA2000 and fixed network and so on. The IMS can realize the convergence of the fixed network and the mobile network.

IMS security relates to a plurality of network elements of an IMS core network. For a terminal, the IMS security mainly aims at establishing a security link between the terminal and a proxy-call session control function (P-CSCF) of the IMS.

FIG. 1 is a schematic diagram of the layered structure of the IMS security network according to the related art. As shown in FIG. 1, according to the layered model of the network, the IMS security of the terminal comprises access layer security, network layer security, transport layer security and application layer security. In the above, the application layer security provides bidirectional authentication for the user identity, and is realized mainly through the authentication and authorization of the IMS message digest registered by the IMS and the IMS authentication and key agreement (IMS-AKA); the transport layer security is realized through the transport layer security/secure socket layer (TLS/SSL); the network layer security is realized through IP security (IPsec); and the access layer security varies according to different network access modes, and for the WLAN, it mainly comprises the 802.111 of IEEE and the WAPI Of a Chinese national standard. The WAPI adopts public key encryption system, and uses an authentication service unit (ASU) to realize the bidirectional authentication and confidential transmission between a WLAN terminal and an access point (AP).

When a mobile terminal with the WAPI functions accesses the IMS, if the above-mentioned multiple security mechanisms are adopted at the same time, security redundancy will be caused, with the result that the quality of service (QoS) is reduced (e.g. the network delay is increased) and the resource consumption is increased (e.g. the power consumption of the terminal is increased). For the problem of how to realize the security mechanisms without causing the security redundancy when the WAPI terminal accessing the IMS system, no effective solution has been proposed in the related art.

SUMMARY OF THE PRESENT INVENTION

The present invention is put forward in consideration of the problems in the related art that the service quality is reduced and the resource consumption is increased because a plurality of security mechanisms are adopted at the same time when the mobile terminal accesses the IMS system. For this reason, the present invention mainly aims at providing a security management method and a security management system for the WAPI terminal accessing the IMS network to solve at least one of above-mentioned problems in the related art.

In order to achieve the above-mentioned purpose, the present invention provides a security management method for a WAPI terminal accessing an IMS network according to one aspect of the present invention.

The security management method according to the present invention comprises: an authentication service unit (ASU) sending, under the circumstance that an access point and the WAPI terminal pass the verification of the ASU, a security information request message to a home subscriber server (HSS), wherein the security information request message carries IMS account information of the WAPI terminal; the HSS setting security information corresponding to the IMS account information of the WAPI terminal as access layer security after receiving the security information request message from the ASU; and a proxy-call session control function (P-CSCF) receiving an IMS login request message from the WAPI terminal, inquiring about the security information of the WAPI terminal through the HSS, and allowing the WAPI terminal to execute an IMS service flow under the circumstance that the security information of the WAPI terminal is the access layer security.

Preferably, the step of the ASU verifying the access point and the WAPI terminal comprises: the ASU verifying a signature and a certificate of the access point, and further verifying a signature of the WAPI terminal under the circumstance that the signature and the certificate of the access point pass the verification; and the ASU determining that the access point and the WAPI terminal pass the verification under the circumstance that the signature of the WAPI terminal passes the verification.

Preferably, before the step of the ASU verifying the access point and the WAPI terminal, the method further comprises: the access point sending an authentication activating message to the WAPI terminal, wherein the authentication activating message carries a certificate of the access point, parameter information of a elliptic curve Diffie-Hellman (ECDH), identifier information of the ASU, and authentication identifier information of the ASU; the WAPI terminal receiving the authentication activating message, and sending an access authentication request message to the access point, wherein the access authentication request message carries a certificate of the WAPI terminal, a certificate of the access point, parameter information of the ECDH, and ECDH public key information of the WAPI terminal; and the access point sending a certificate authentication request message to the ASU, wherein the certificate authentication request message carries a signature and the certificate of the access point, and a signature of the WAPI terminal.

Preferably, after the step of the HSS setting the security information corresponding to the IMS account information of the WAPI terminal as access layer security, and before the step of the WAPI terminal sending the IMS login request message to the P-CSCF, the method further comprises: the access point receiving a certificate authentication response message from the ASU, and sending an access authentication response message to the WAPI terminal; and the access point and the WAPI terminal performing unicast key agreement to determine a base key adopted during encrypted transmission of data between the access point and the WAPI terminal, wherein under the circumstance that the agreement is successful, the data transmitted between the access point and the WAPI terminal is encrypted and decrypted by using the base key.

Preferably, the step of the access point and the WAPI terminal performing unicast key agreement comprises: the access point sending a unicast key agreement request message to the WAPI terminal; and the access point receiving a unicast key agreement response message from the WAPI terminal, and sending a unicast key agreement confirmation message to the WAPI terminal.

Preferably, under the circumstance that the WAPI terminal quits the IMS services, the method also comprises: the ASU receiving a releasing link and verification request message from the access point, and sending a security information releasing request message to the HSS, wherein the security information releasing request message carries the IMS account information of the released WAPI terminal; and the HSS receiving the security information releasing request message from the ASU, and setting the access layer security of the security information corresponding to the IMS account information of the WAPI terminal as null.

The present invention provides a security management system for a WAPI terminal accessing an IMS network according to another aspect of the present invention.

The security management system according to the present invention comprises: an authentication service unit (ASU), configured to verify an access point and the WAPI terminal, and send a security information request message to a home subscriber server (HSS) under the circumstance that the access point and the WAPI terminal pass the verification, wherein the security information request message carries IMS account information of the WAPI terminal; the HSS, configured to receive the security information request message from the ASU, and set security information corresponding to the IMS account information of the WAPI terminal as access layer security; and a proxy-call session control function (P-CSCF), configured to inquire, under the circumstance that an IMS login request message from the WAPI terminal is received, about the security information of the WAPI terminal through the HSS, and perform subsequent processing according to the inquiry result.

Preferably, the ASU further comprises: a verification module, configured to verify the access point and the WAPI terminal; and a sending module, configured to send the security information request message to the HSS under the circumstance that the verification result of the verification module is that the access point and the WAPI terminal pass the verification, wherein the security information request message carries the IMS account information of the WAPI terminal.

Preferably, the HSS further comprises: a first receiving module, configured to receive the security information request message from the sending module; and a setting module, configured to set the security information corresponding to the IMS account information of the WAPI terminal as access layer security according to the security information request message received by the first receiving module.

Preferably, the P-CSCF further comprises: a second receiving module, configured to receive the IMS login request message from the WAPI terminal; and an inquiry module, configured to inquiring about the security information of the WAPI terminal through the HSS, and perform subsequent processing according to the inquiry result.

In virtue of the technical solution of the present invention, through setting the access layer security information of the verified WAPI terminal in the HSS, and allowing the WAPI terminal whose security information is stored to access the IMS system, the power consumption of the WAPI terminal is reduced under the precondition that the security of the IMS system is guaranteed, and thus the user experience can be improved.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF EMBODIMENTS

General Description of Functions

The main concept of the embodiments of the present invention is as follows: an ASU sends security information of a WAPI terminal which passes the verification to the HSS, and the HSS sets the security information corresponding to the WAPI terminal as access layer security; when the WAPI terminal initiates an IMS login request, a P-CSCF inquires about the security information of the WAPI terminal through the HSS, and allows the WAPI terminal to execute IMS service flow under the circumstance that the security information of the WAPI terminal is access layer security.

The preferable embodiments of the present invention will be detailed hereinafter in connection with the drawings. What should be understood is that the preferable embodiments detailed hereafter are given by way of illustration only, and thus are not limitative of the present invention. If there is no conflict, the embodiments of the present invention and the characteristics in the embodiments can be combined with each other.

Method Embodiments

According to an embodiment of the present invention, a security management method for the WAPI terminal accessing the IMS network is provided.

Figure 1:
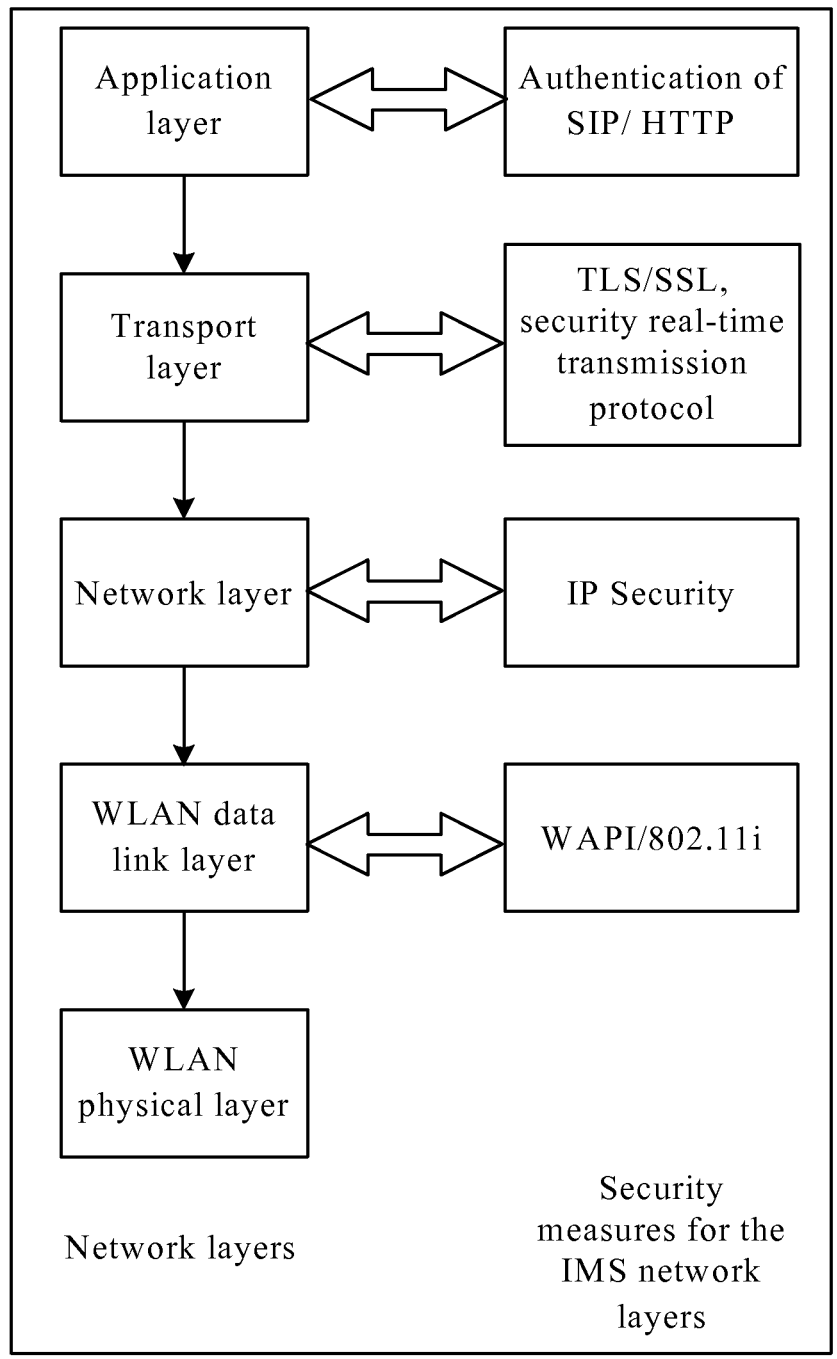
FIG. 1 is a schematic diagram of the layered structure of IMS security network according to the related art.
Figure 2:
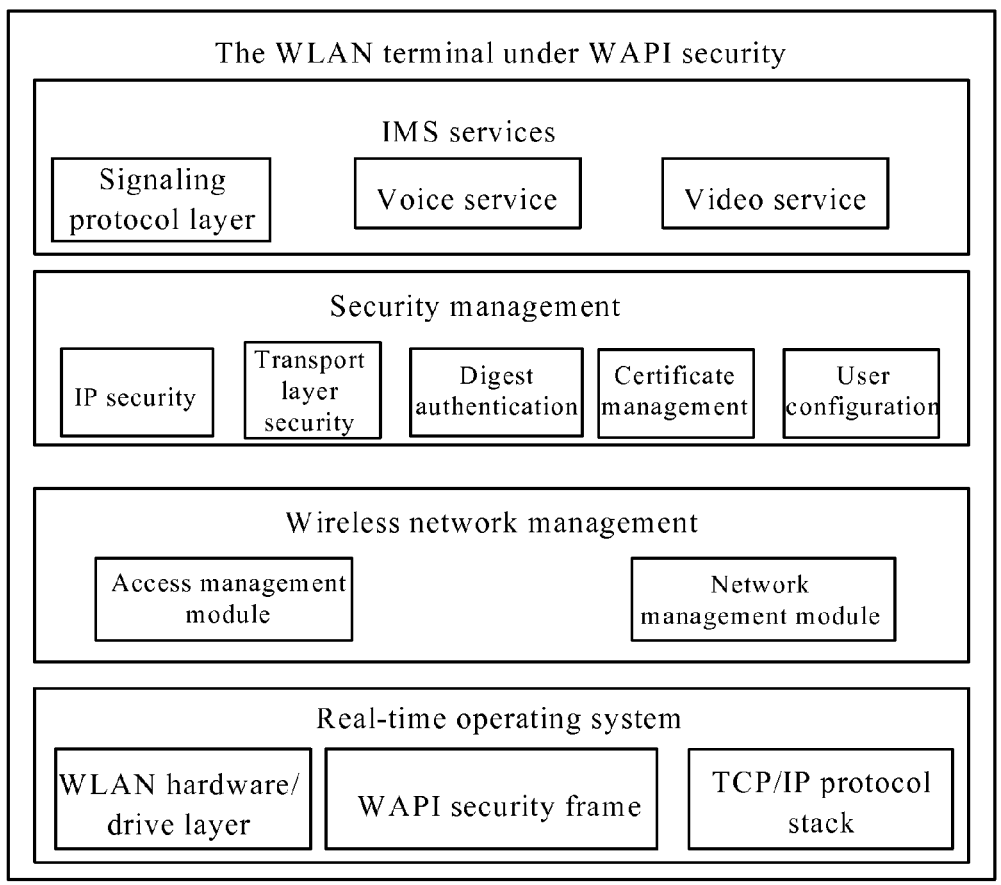
FIG. 2 is a structural schematic diagram of the realization principle of the WAPI terminal according to an embodiment of the present invention.

FIG. 2 is a structural schematic diagram of the realization principle of the WAPI terminal according to the embodiment of the present invention. As shown in FIG. 2, the WAPI terminal can be divided into four layers: an operating system layer, a wireless network management layer, a security management layer and an IMS application layer.

In the above, the operating system layer mainly comprises the drive of a WAPI chip, system calls of a WAPI security implementation, and a TCP/IP protocol stack.

The wireless network management layer is responsible for the access and handoff of various mobile phone wireless networks, e.g. GPRS activation or WLAN correlation, and IP channel establishment for upper layer services.

The security management layer is responsible for the execution of various security modes, the management of security configuration information, and the establishment of corresponding security link according to the demand of the upper layer services.

The IMS application layer comprises a signaling layer (e.g. session initiation protocol (SIP), hypertext transfer protocol (HTTP) etc.), various voice services (e.g. IP voice, push-to-talk etc.), and various video services (e.g. video share, video telephone and video conference etc.).

When a certain service of the IMS application layer is started, the security management layer and the wireless network management layer are notified to establish the IP channel for the service and execute a certain kind of security mode, e.g. WAPI security; the security management layer distributes corresponding security configuration information (e.g. certificate storage path, pre-share key) to the wireless network management layer; the wireless network management layer invokes the WAPI security interface provided by the operating system according to the designated security mode to start the WAPI negotiation process; the operating system layer is responsible for the sending and receiving of various WAPI request messages (primitive), notifies the wireless network management layer that the IP channel has been established successfully after receiving the correlation success response of the AP, opens the data channel of the WAPI chip, and allows the IP packet transmission; the wireless network management layer notifies the IMS application layer and the security management layer that the relevant bottom layer has established the security link; the IMS application layer initiates the IMS login process through the SIP protocol, generates the SIP login message in the application layer, and distributes the SIP login message to the bottom layer TCP/IP protocol stack which transmits the SIP login message to the SIP login proxy through the WAPI chip; after the response from the SIP login proxy is received, the bottom layer notifies the IMS application layer. After the IMS application layer analyzes the SIP message, whether the server knows that the bottom layer of the terminal has adopted the access layer security mechanism can be judged, and whether the other security mechanisms need to be established is judged.

Figure 3:
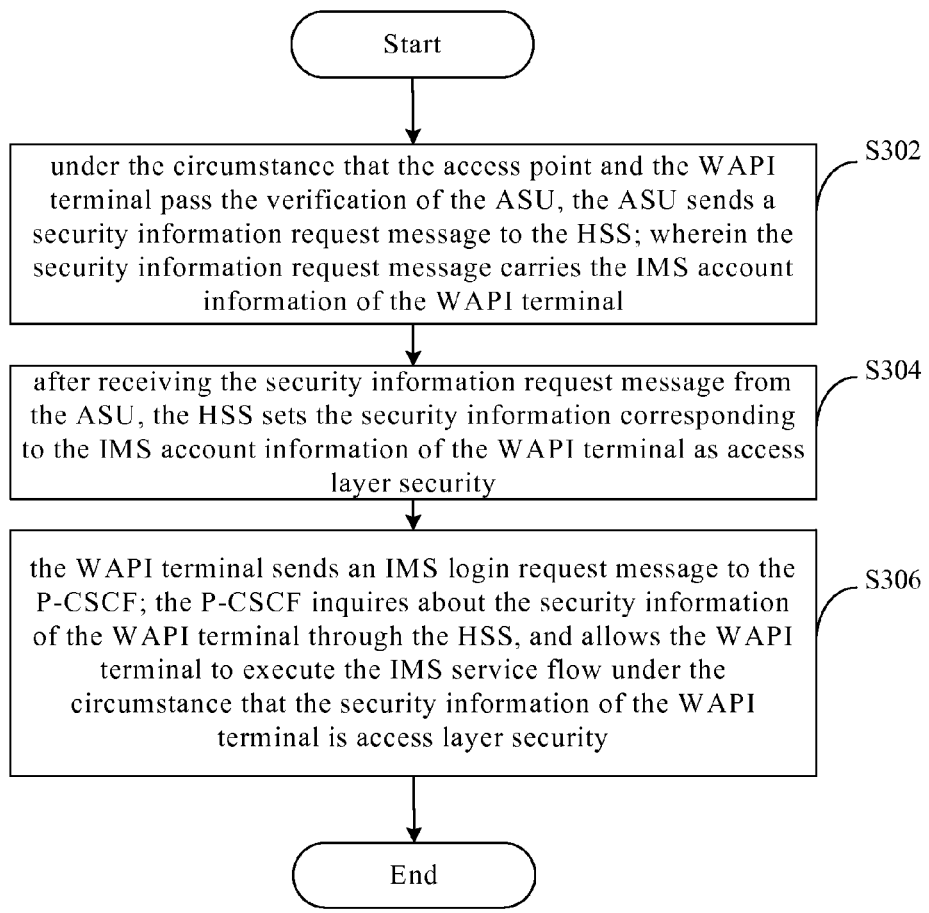
FIG. 3 is a flowchart of the security management method for the WAPI terminal accessing the IMS network according to an embodiment of the present invention.

FIG. 3 is a flowchart of the security management method for the WAPI terminal accessing the IMS network according to an embodiment of the present invention. What needs to be explained is that the steps detailed in the following method can be executed in a computer system composed of a group of computers which can execute instructions. Furthermore, although FIG. 3 shows the logic sequence, the steps as shown or described can be executed in the sequences different from the above-mentioned sequence under certain circumstances. As shown in FIG. 3, the method comprises the steps as follows (step S302-step S306).

Step S302, under the circumstance that the access point and the WAPI terminal pass the verification of the ASU, the ASU sends a security information request message to the HSS, wherein the security information request message carries the IMS account information of the WAPI terminal;

Step S304, after receiving the security information request message from the ASU, the HSS sets the security information corresponding to the IMS account information of the WAPI terminal as access layer security.

Step S306, the WAPI terminal sends an IMS login request message to the P-CSCF; the P-CSCF inquires about the security information of the WAPI terminal through the HSS, and allows the WAPI terminal to execute the IMS service flow under the circumstance that the security information of the WAPI terminal is access layer security.

Based on the above-mentioned steps, the WAPI terminal and the IMS network can transmit the data safely. After the IMS network performs security authentication and confidential transmission to the WAPI terminal in the access layer, the IPSEC mechanism in the network layer is not required any more.

The above-mentioned steps will be detailed hereinafter.

(I) Step S302

Firstly, the access point sends an authentication activating message to the WAPI terminal, wherein the authentication activating message carries the certificate of the access point, the parameter information of the elliptic curve Diffie-Hellman (ECDH), the identifier information of the ASU, and the authentication identifier information of the ASU.

Furthermore, the WAPI terminal receives the authentication activating message, and sends an access authentication request message to the access point, wherein the access authentication request message carries the certificate of the WAPI terminal, the certificate of the access point, the parameter information of the ECDH, and the ECDH public key information of the WAPI terminal; the access point sends a certificate authentication request message to the ASU, wherein the certificate authentication request message carries the signature and the certificate of the access point, and the signature of the WAPI terminal.

Based on the above, the ASU receives the certificate authentication request message from the access point, verifies the signature and the certificate of the access point, further verifies the signature of the WAPI terminal which accessed the IMS network through the access point under the circumstance that the signature and the certificate of the access point pass the verification, and determines that the access point and the WAPI terminal pass the verification under the circumstance that the signature of the WAPI terminal passes the verification.

(II) Step S304 and Step S306

After receiving the security information request message from the ASU, the HSS sets the security information corresponding to the IMS account information of the WAPI terminal as access layer security, and returns a security information response message to the ASU.

Furthermore, the ASU sends the certificate authentication response message to the access point, and sends the access authentication response message to the WAPI terminal; the access point and the WAPI terminal perform unicast key agreement to determine the base key adopted during encrypted transmission of data between the access point and the WAPI terminal. Under the circumstance that the key agreement is successful, the data transmitted between the access point and the WAPI terminal is encrypted and decrypted by using the base key.

According to the present invention, the WAPI terminal sends the IMS login request message to the P-CSCF; the P-CSCF inquires about the security information of the WAPI terminal through the HSS, and allows the WAPI terminal to execute the IMS service flow under the circumstance that the security information of the WAPI terminal is access layer security.

Based on the above-mentioned processes, under the circumstance that the WAPI terminal quits the IMS services, the ASU receives the releasing link and verification request message from the access point, and sends the security information releasing request message to the HSS, wherein the security information releasing request message carries the IMS account information of the released WAPI terminal; the HSS receives the security information releasing request message from the ASU, and sets the access layer security of the security information corresponding to the IMS account information of the WAPI terminal as null.

Figure 4:
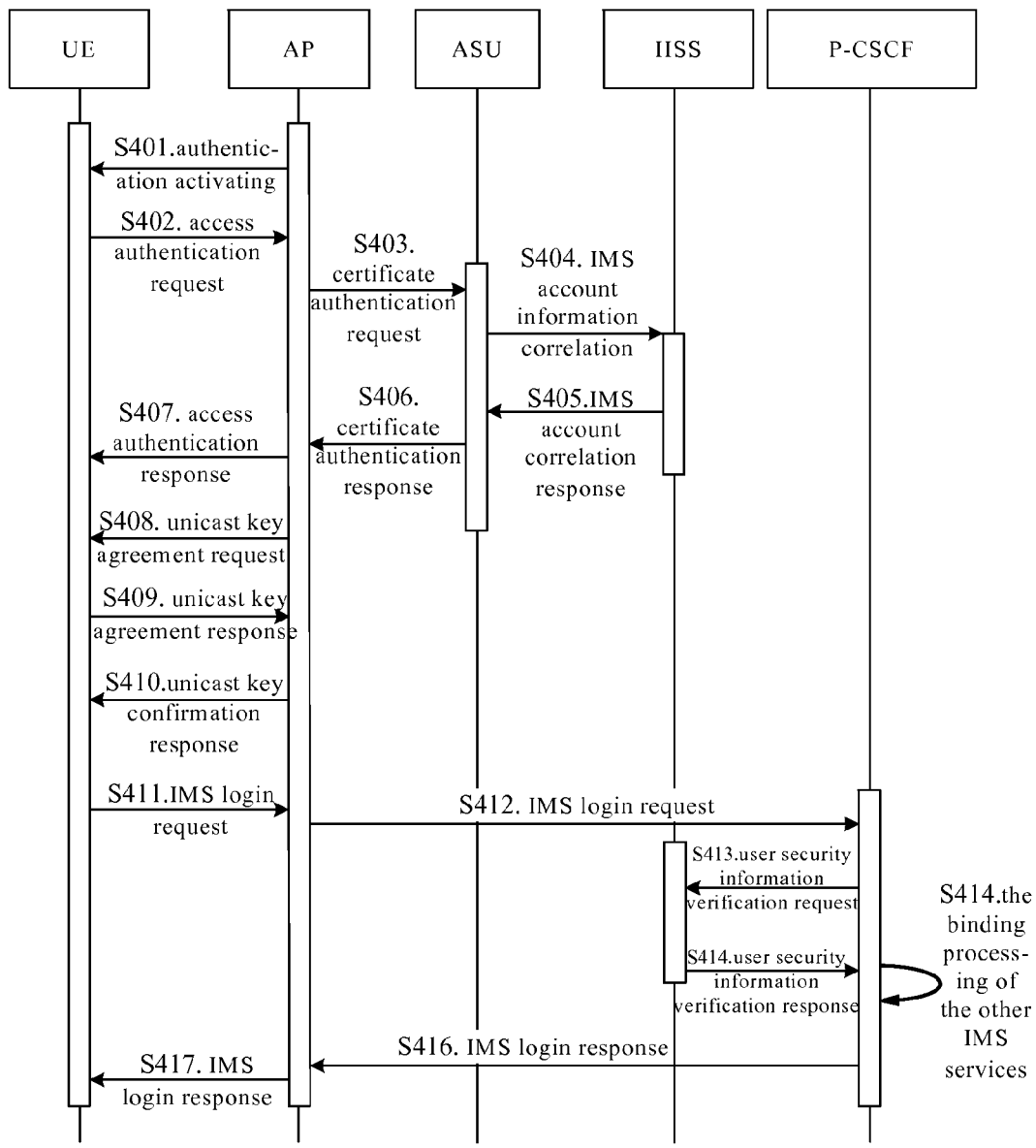
FIG. 4 is a flowchart of the login flow of the IMS service according to a method embodiment of the present invention.

FIG. 4 is a flowchart of the login flow of the IMS service according to the method embodiment of the present invention. As shown in FIG. 4, when the WAPI terminal (terminal for short hereafter) with WLAN wireless functions accesses the IMS network, the flow comprises the steps as follows (step S401-step S417).

Step S401, when the terminal is required to be correlated or re-correlated to the AP, the AP sends an authentication request activating message to the terminal to start the whole authentication process of the WAPI, wherein the authentication request activating message comprises the certificate of the AP, the relevant parameters of the ECDH, the identifier of the ASU, and the authentication identifier of the ASU.

Step S402, after receiving the authentication request activating message from the AP, the terminal sends the access authentication request message to the AP, wherein the message comprises the certificate of the terminal, the certificate of the AP, the parameters of the ECDH, and the temporary public key used during ECDH exchange.

Step S403, after receiving the access authentication request message from the terminal, the AP sends a certificate authentication request packet to the ASU, wherein the packet comprises the certificates of the AP and the terminal, and the signature generated by the AP.

Step S404, after receiving the certificate authentication request packet, the ASU verifies the validity of the AP signature and AP certificate, if they are not correct, the authentication process fails; if they are correct, the ASU further verifies the certificate of the terminal. If the verification is successful, the ASU sends an IMS account security information correlation request packet to the HSS network element of the IMS through the extended protocol of a Cx interface, wherein the packet comprises the IMS account of the terminal, and the field information of the certificate of the terminal.

Step S405, the HSS sets the security information of the IMS account as access layer security, and sends an IMS account security information correlation response packet to the ASU.

Step S406, after receiving the response packet from the HSS, the ASU judges whether the correlation is successful, if the correlation is unsuccessful, the authentication process fails. The ASU sends a certificate authentication response packet to the AP, wherein the packet comprises the authentication result of terminal certificate, the authentication result of AP certificate, and the final verification result information and so on.

Step S407, the AP perform signature verification to the certificate authentication response returned from the ASU to obtain the authentication result of the terminal certificate which is used for access control of the terminal. The AP sends the access authentication response message to the terminal, wherein the message comprises the information of the access result of the terminal, the temporary public key generated by the AP, and the certificate verification result and so on.

Step S408, if the AP certificate is successfully verified, a random number is generated and is encrypted by using the ECDH public key of the terminal; and a unicast key agreement request message is sent to the terminal.

Step S409, after receiving the unicast key agreement request message, the terminal performs decryption by using the private key and performs verification. If the verification is successful, the terminal sends the unicast key agreement response message which is encrypted by using the public key of the AP to the AP, wherein the response message comprises the information of unicast key, the random number of the AP, the random number of the terminal, and the WADI information elements and so on.

Step S410, after receiving the unicast key agreement response message, the AP performs the decryption by using the private key of the AP, and verifies the decrypted message field information. If the verification is successful, the AP sends the unicast key agreement confirmation message to the terminal. Afterwards, the base key is used for the encryption and decryption between the AP and the terminal.

Step S411, the terminal starts the IMS service, generates an IMS login request packet, and sends the IMS login request packet to the AP after the IMS login request packet is encrypted in the data link layer by the base key negotiated before.

Step S412, the AP sends the IMS login request to the P-CSCF.

Step S413, after the P-CSCF receives the IMS login request, the S-CSCF inquires the HSS about the IMS account information, wherein the information comprises the security configuration information thereof.

Step S414, the HSS sends the security information of the IMS account to the S-CSCF, and forwards the same to the P-CSCF. The IMS account is in the state of access layer security, so the security correlation process of the network layer and transport layer is not necessary any more.

Step S415, the P-CSCF forwards the IMS login message to the corresponding application server to perform the binding of IMS service.

Step S416, the P-CSCF sends an IMS login response packet to the AP according to the login response returned from the application server.

Step S417, the AP sends the IMS login response packet to the terminal. Afterwards, the terminal can perform the IMS service flow services such as multimedia voice phone, video telephone, and video share and so on.

Figure 5:
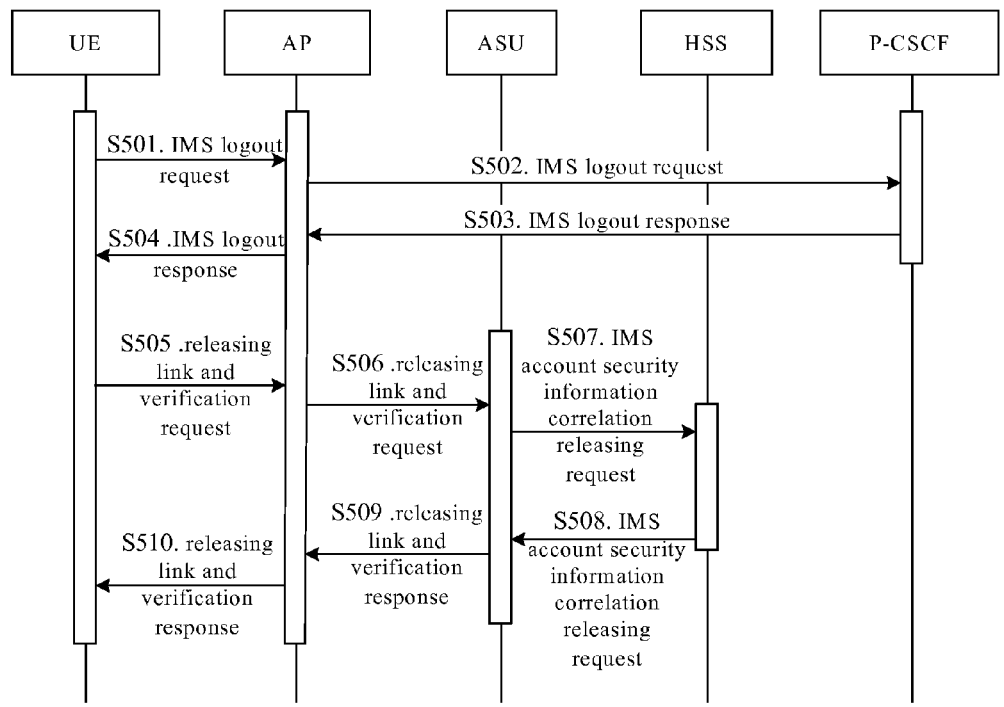
FIG. 5 is a flowchart of the logout flow of the IMS service according to a method embodiment of the present invention.

Under the circumstance that the WAPI terminal quits the IMS services, the processes as shown in FIG. 5 are executed.

FIG. 5 is a flowchart of the logout flow of the IMS service according to the method embodiment of the present invention. As shown in FIG. 5, the processing flow that the terminal quits the IMS services comprises the step S501-step S510 as follows.

Step S501, the terminal quits the IMS services, generates an IMS logout request packet, and sends the IMS logout request packet to the AP.

Step S502, the AP forwards the IMS logout request packet to the P-CSCF.

Step S503, the P-CSCF completes corresponding service unbinding process, and forwards an IMS logout response packet to the terminal through the AP.

Step S504, the terminal receives the IMS logout response packet forwarded by the AP, and quits corresponding IMS service application.

Step S505, when the terminal does not have applications which need the WLAN to access the network, the terminal sends a releasing link and verification request message to the AP.

Step S506, after receiving the releasing link and verification request message, the AP generates a releasing link and verification request packet, and sends the releasing link and verification request packet to the ASU.

Step S507, after receiving the releasing link and verification request packet, the ASU sends an IMS account security correlation releasing request packet to the HSS through the extended protocol of the Cx interface.

Step S508, the HSS sets the access layer security identifier of the security information of the IMS account as null, and sends an IMS account security information response packet to the ASU.

Step S509, the ASU generates a releasing link and verification response packet, and sends the releasing link and verification response packet to the AP.

Step S510, after receiving the releasing link and verification response packet, the AP sends a releasing link and verification response message to the terminal, closes the data channel to the terminal, and sets the authentication state as initial state.

The above-mentioned embodiments respectively describe the preferable processing flows that the WAPI terminal accesses and quits the IMS services according to the embodiment of the present invention.

According to an embodiment of the present invention, a computer readable medium is also provided. The computer readable medium is stored with computer executable instructions. When the instructions are executed by a computer or a processor, the computer or the processor is made to execute the steps as shown in FIG. 3, FIG. 4 and FIG. 5. Preferably, the above-mentioned method embodiments can be executed.

Device Embodiment

The embodiment of the present invention also provides a security management system for the WAPI terminal accessing the IMS network. The system can be used to realize the security management method for the WAPI terminal accessing the IMS network provided in the above-mentioned method embodiments.

Figure 6:
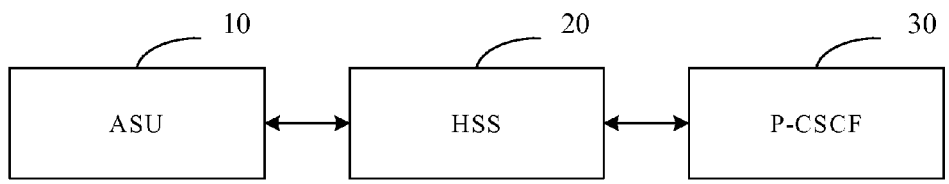
FIG. 6 is a flowchart of the security management system for the WAPI terminal accessing the IMS network according to an embodiment of the present invention.

FIG. 6 is a flowchart of the security management system for the WAPI terminal accessing the IMS network according to the embodiment of the present invention. As shown in FIG. 6, the system comprises an ASU 10, an HSS 20, and a P-CSCF 30 which will be detailed hereafter:

The ASU 10 is arranged in the WAPI, and is used for verifying the access point and the WAPI terminal, and sending the security information request message to the HSS under the circumstance that the access point and the WAPI terminal pass the verification, wherein the security information request message carries the IMS account information of the WAPI terminal.

The HSS 20 is arranged in the IMS system, is connected with the ASU 10, and is used for receiving the security information request message from the ASU, and setting the security information corresponding to the IMS account information of the WAPI terminal as access layer security.

The P-CSCF 30 is arranged in the IMS system, is connected with the HSS 20, and is used for inquiring about the security information of the WAPI terminal through the HSS under the circumstance that the IMS login request message from the WAPI terminal is received, and performing subsequent processing according to the inquiry result.

In the above, the ASU further comprises: a verification module (unshown) which is used for verifying the access point and the WAPI terminal; and a sending module (unshown) which is connected with the verification module, and is used for sending the security information request message to the HSS under the circumstance that the verification result of the verification module is that the access point and the WAPI terminal pass the verification, wherein the security information request message carries the IMS account information of the WAPI terminal.

Furthermore, the HSS further comprises: a first receiving module (unshown) which is used for receiving the security information request message from the sending module; and a setting module (unshown) which is connected with the first receiving module, and is used for setting the security information corresponding to the IMS account information of the WAPI terminal as access layer security according to the security information request message received by the first receiving module.

In addition, the P-CSCF further comprises: a second receiving module (unshown) which is used for receiving the IMS login request message from the WAPI terminal; and an inquiry module (unshown) which is connected with the second receiving module and the setting module respectively, and is used for inquiring about the security information of the WAPI terminal through the HSS, and performing subsequent processing according to the inquiry result.

During specific implementation, the system according to the device embodiments of the present invention can also complete the steps as shown in FIG. 2-FIG. 5, and the specific processing process will not be repeated here any more.

To sum up, in virtue of the technical solution of the present invention, through setting the access layer security information of the verified WAPI terminal in the HSS, and allowing the WAPI terminal whose security information is stored to access the IMS system, the power consumption of the WAPI terminal can be reduced under the precondition that the security of the IMS system is guaranteed, and user experience can be improved.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the step of the present invention can be realized by using the executable program code of the calculating device. Consequently, the modules and the steps can be stored in the storage device and executed by the calculating device, or the modules and the steps are made into integrated circuit module respectively, or a plurality of modules or steps thereof are made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all included in the protection scope of the present invention.

What is claimed is:

1. A security management method for a WAPI terminal accessing an IP multimedia subsystem (IMS) network, the method comprising:

sending, by an authentication service unit (ASU), responsive to an access point and the WAPI terminal passing the verification of the ASU, a security information request message to a home subscriber server (HSS), wherein the security information request message carries IMS account information of the WAPI terminal;

setting, by the HSS, security information corresponding to the IMS account information of the WAPI terminal as access layer security configuration information after receiving the security information request message from the ASU; and receiving, by a proxy-call session control function (P-CSCF), an IMS login request message from the WAPI terminal, inquiring about the security information of the WAPI terminal through the HSS, and allowing the WAPI terminal to execute an IMS service flow responsive to the security information of the WAPI terminal being the access layer security configuration information.

2. The method according to claim 1, wherein the ASU verifying the access point and the WAPI terminal comprises:

verifying, by the ASU, a signature and a certificate of the access point, and further verifying a signature of the WAPI terminal responsive to the signature and the certificate of the access point passing the verification; and determining, by the ASU, that the access point and the WAPI terminal pass the verification responsive to the signature of the WAPI terminal passing the verification.

3. The method according to claim 2, wherein responsive to the WAPI terminal terminating the services associated with the IMS service flow, the method also comprises:

receiving, by the ASU, a releasing link and verification request message from the access point, and sending a security information releasing request message to the HSS, wherein the security information releasing request message carries the IMS account information of the released WAPI terminal; and receiving, by the HSS, the security information releasing request message from the ASU, and setting the access layer security configuration information of the security information corresponding to the IMS account information of the WAPI terminal as null.

4. The method according to claim 1, wherein before the ASU verifies the access point and the WAPI terminal, the method further comprises:

sending, by the access point, an authentication activating message to the WAPI terminal, wherein the authentication activating message carries a certificate of the access point, parameter information of an elliptic curve Diffie-Hellman (ECDH), identifier information of the ASU, and authentication identifier information of the ASU;

receiving, by the WAPI terminal, the authentication activating message, and sending an access authentication request message to the access point, wherein the access authentication request message carries a certificate of the WAPI terminal, a certificate of the access point, parameter information of the ECDH, and ECDH public key information of the WAPI terminal; and sending, by the access point, a certificate authentication request message to the ASU, wherein the certificate authentication request message carries a signature and the certificate of the access point, and a signature of the WAPI terminal.

5. The method according to claim 4, wherein after the HSS sets the security information corresponding to the IMS account information of the WAPI terminal as access layer security configuration information, and before the WAPI terminal sends the IMS login request message to the P-CSCF, the method further comprises:

receiving, by the access point, a certificate authentication response message from the ASU, and sending an access authentication response message to the WAPI terminal; and performing, by the access point and the WAPI terminal, unicast key agreement to determine a base key adopted during encrypted transmission of data between the access point and the WAPI terminal, wherein responsive to the agreement being successful, the data transmitted between the access point and the WAPI terminal is encrypted and decrypted by using the base key.

6. The method according to claim 4, wherein responsive to the WAPI terminal terminating the services associated with the IMS service flow, the method also comprises:

receiving, by the ASU, a releasing link and verification request message from the access point, and sending a security information releasing request message to the HSS, wherein the security information releasing request message carries the IMS account information of the released WAPI terminal; and receiving, by the HSS, the security information releasing request message from the ASU, and setting the access layer security configuration information of the security information corresponding to the IMS account information of the WAPI terminal as null.

7. The method according to claim 5, wherein the access point and the WAPI terminal performing unicast key agreement comprises:

sending, by the access point, a unicast key agreement request message to the WAPI terminal; and receiving, by the access point, a unicast key agreement response message from the WAPI terminal, and sending a unicast key agreement confirmation message to the WAPI terminal.

8. The method according to claim 5, wherein responsive to the WAPI terminal terminating the services associated with the IMS service flow, the method also comprises:

receiving, by the ASU, a releasing link and verification request message from the access point, and sending a security information releasing request message to the HSS, wherein the security information releasing request message carries the IMS account information of the released WAPI terminal; and receiving, by the HSS, the security information releasing request message from the ASU, and setting the access layer security configuration information of the security information corresponding to the IMS account information of the WAPI terminal as null.

9. The method according to claim 7, wherein responsive to the WAPI terminal terminating the services associated with the IMS service flow, the method also comprises:

receiving, by the ASU, a releasing link and verification request message from the access point, and sending a security information releasing request message to the HSS, wherein the security information releasing request message carries the IMS account information of the released WAPI terminal; and receiving, by the HSS, the security information releasing request message from the ASU, and setting the access layer security configuration information of the security information corresponding to the IMS account information of the WAPI terminal as null.

10. The method according to claim 1, wherein responsive to the WAPI terminal terminating the services associated with the IMS service flow, the method also comprises:

receiving, by the ASU, a releasing link and verification request message from the access point, and sending a security information releasing request message to the HSS, wherein the security information releasing request message carries the IMS account information of the released WAPI terminal; and receiving, by the HSS, the security information releasing request message from the ASU, and setting the access layer security configuration information of the security information corresponding to the IMS account information of the WAPI terminal as null.

11. A security management system for a WAPI terminal accessing into an IP multimedia subsystem (IMS) network, the system comprising:

an authentication service unit (ASU), configured to verify an access point and the WAPI terminal, and send a security information request message to a home subscriber server (HSS) responsive to the access point and the WAPI terminal passing the verification, wherein the security information request message carries IMS account information of the WAPI terminal;

the HSS, configured to receive the security information request message from the ASU, and set security information corresponding to the IMS account information of the WAPI terminal as access layer security configuration information; and a proxy-call session control function (P-CSCF), configured to inquire, responsive to receiving an IMS login request message from the WAPI terminal, about the security information of the WAPI terminal through the HSS, and perform subsequent processing according to the inquiry result.

12. The system according to claim 11, wherein the ASU further comprises:

a verification module, configured to verify the access point and the WAPI terminal; and a sending module, configured to send the security information request message to the HSS responsive to the verification result of the verification module being that the access point and the WAPI terminal pass the verification, wherein the security information request message carries the IMS account information of the WAPI terminal.

13. The system according to claim 12, wherein the HSS further comprises:

a first receiving module, configured to receive the security information request message from the sending module; and a setting module, configured to set the security information corresponding to the IMS account information of the WAPI terminal as access layer security configuration information according to the security information request message received by the first receiving module.

14. The system according to claim 13, wherein the P-CSCF further comprises:

a second receiving module, configured to receive the IMS login request message from the WAPI terminal; and an inquiry module, configured to inquire about the security information of the WAPI terminal through the HSS, and perform subsequent processing according to the inquiry result.

* * * * *